United States Patent [19]
Will

[11] Patent Number: 5,148,660
[45] Date of Patent: Sep. 22, 1992

[54] LAWN MOWER BLADE LIFT WING PROTECTOR

[76] Inventor: Edward A. Will, 2160 Oakridge La., Palm Bay, Fla. 32905

[21] Appl. No.: 750,093

[22] Filed: Aug. 26, 1991

[51] Int. Cl.⁵ .............................................. A01B 34/03
[52] U.S. Cl. .................. 56/295; 56/DIG. 17
[58] Field of Search ........ 56/17.5, 255, 295, DIG. 17, 56/DIG. 20

[56] References Cited

U.S. PATENT DOCUMENTS

| | | | |
|---|---|---|---|
| 2,722,797 | 11/1955 | Strattman | 56/295 |
| 3,156,082 | 11/1964 | Joyner | 56/295 |
| 3,302,377 | 2/1967 | Ely | 56/295 |
| 3,425,199 | 2/1969 | Freedlander et al. | 56/295 |
| 3,440,808 | 4/1969 | Freedlander et al. | 56/295 |
| 3,614,861 | 10/1971 | Wickham et al. | 56/295 |
| 3,782,039 | 1/1974 | Warwick | 56/250 X |
| 5,077,961 | 1/1992 | Schumacher et al. | 56/295 X |

FOREIGN PATENT DOCUMENTS 2088685 6/1992 United Kingdom .................. 56/295

*Primary Examiner*—George A. Suchfield
*Attorney, Agent, or Firm*—Jack N. McCarthy

[57] ABSTRACT

A rotary mower blade for mounting on a power driven rotary lawn mower and designed for improved durability, performance, and safety. The blade is formed of solid metal in the conventional manner, but has an added elastomeric protective shielding applied to each uplifted flange area. The shielding of a layer of polyurethane can be mounted in a recess in the surface of the blade.

14 Claims, 1 Drawing Sheet

LAWN MOWER BLADE LIFT WING PROTECTOR

DESCRIPTION

1. Technical Field

This invention relates to a shield to be bonded to the leading surfaces of each lift wing of a conventional steel rotary mower blade; this shielding being made of a durable resilient elastomeric material that will substantially reduce wear to the lift wing from abrasion and the like to greatly increase the useful life of a blade.

2. Background Art

Conventional lawn mowers used by the average homeowner are usually rotary and are gasoline or electric motor operated. This type of mower is also popular with industrial mowing operations.

The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the performance of the cutting blade not only depends on a sharp cutting edge, but also having trailing lift wing or uplifted flange area on said blade. This lift wing working with, and as part of the blade, provides the air flow necessary to perform a satisfactory cutting job.

While the conventional steel blade may be re-sharpened as needed, nothing can be done to maintain the lift wing areas which tend to wear out long before the cutting edges are rendered useless. Additionally, the severely worn lift wings become fragmented and present a safety hazard. For this safety reason, most professional lawn mower service shops will not re-sharpen a blade that has severe lift wing damage. While a blade with a worn lift wing may be re-sharpened, the overall performance suffers because of the resulting loss of lift, and the aforementioned safety hazard still remains.

This loss of lift is particularly troublesome where bagging, or collection of the grass, is required. Lawn mower blade wear is especially severe in sandy types of soils.

DISCLOSURE OF THE INVENTION

It is an object of this invention to provide for an elastomeric shielding material to be bonded to the leading surfaces of each lift wing of a conventional steel blade to substantially reduce wear to the lift wing from abrasion and thus to greatly extend the useful life of a lawm mower blade.

It is another object of this invention to cut the protective material of the blade at such an angle as to provide an increase in the lift generated by the lawn mower blade to assure a more even cutting action of the blade.

It is a further object of this invention, because of the resulting increase in lift, to provide for more efficient movement of the grass clippings for bagging.

It is another object of this invention to form a shallow recess in the top of the blade to place the protective material. The forward edge of the protective material set in a recess will reduce the tendency of sand, dirt, et. to force itself under the protective material.

It is a further object of this invention to place the forward edge of the protective material parallel to and back from the rearward top of the cutting surface approximately 2 to 5 mm.

The foregoing, and other features and advantages of the present invention will become more apparent from the following description and accompanying drawings.

BEST MODE FOR CARRYING OUT THE INVENTION

Figure 1:
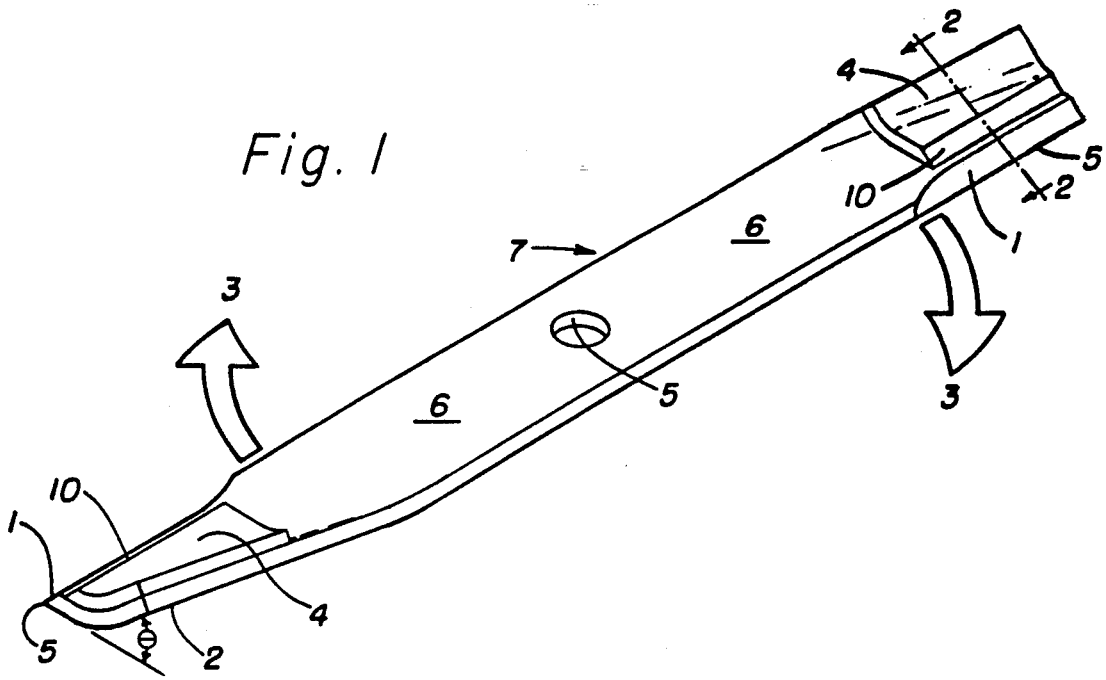
FIG. 1 is a perspective view of a rotary mower blade showing my invention.
Figure 3:
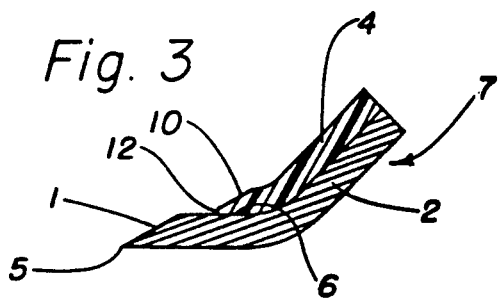
FIG. 3 is a cross-sectional view of a modification of the rotary mower blade taken along the line 2—2 of FIG. 1.

The mower blade of this invention, which is generally indicated at 7 of FIG. 1, is designed for horizontal rotation about the center of a bolt opening 5 of FIG. 1 at its center for receiving a bolt to attach the blade to a drive shaft of a mower. The blade 7 of FIG. 1 is elongated and is provided at each end with cutting surfaces 1 having leading edges 5 of FIG. 1 which are disposed on the forward side of the blade inasmuch as the blade is designed to rotate in the direction of the arrow 3 of FIG. 1.

Each lift wing 2 of FIG. 1 defines an angle $\theta$ with respect to the adjacent horizontal surface area 6 of FIG. 1. To each lift wing 2 is applied a layer 4 of polyurethane plastic, or similar protective material. Suitable materials include polyurethanes, such as the polyurethane materials supplied by Harkness Industries of Cheshire, Conn. as grades MP600 and MP750. Suitable materials will have Durometer hardness of 55-100 and preferably 60-85 measured on the Shore A scale and will exhibit less than 70 mg and preferably less than 45 mg loss per thousand cycles of Taber abrasion testing using the H18 test at 1,000 gms load (ASTM C501).

The polyurethane layer 4 should be of such a size as to cover the uplifted area of both lift wings 2, and the horizontal surface area 6 of the blade 7 that are adjacent to the lift wings 2. This is accomplished by having a single piece of polyurethane shaped for each lift wing 2 that is covered. The single layer 4 is cut to cover a lift wing 2 with allowance to cover a portion of the adjacent flat surfaces 6 of the blade 7. A mower blade 7, having two lift wings 2, will thus require just two layers 4 of protective material, one for each lift wing 2. The blade 7 can be recessed at 20 to receive the layer 4. This is done to especially prevent the undercutting of the leading edge of the leading surface 10 of layer 4 by sand, dirt particles, etc.

Figure 2:
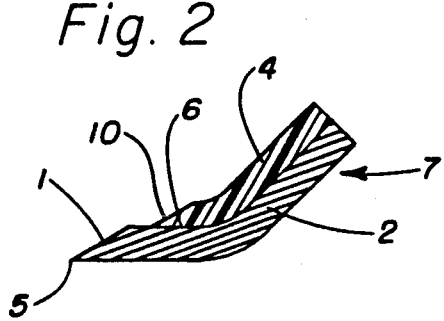
FIG. 2 is a cross-sectional view of the rotary mower blade taken along the line 2—2 of FIG. 1.
Figure 4:
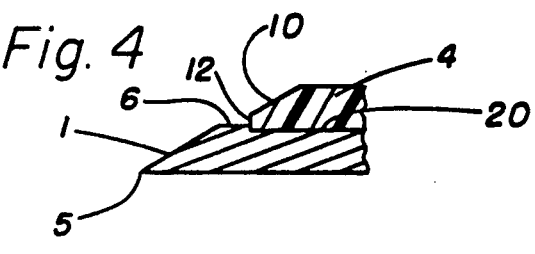
FIG. 4 is an enlargement of the modification of FIG. 3, also showing a recess.

The polyurethane layer 4 should be approximately one-eighth to one-quarter inch in thickness and have a Durometer Shore A hardness of between 60a and 85a. The leading surface 10 of each protective layer 4 of FIG. 2 is cut at an acute angle with reference to the horizontal surface 6 of FIG. 1. Each leading surface 10 of layer 4 on each lift wing 2 provides an increase in the lift generated by the blade to improve the cutting action of the blade 7.

The bonding of the polyurethane layer 4 of the metal of the blade 7 can be accomplished by using a cyanoacrylate-type of adhesive, together with an appropriate primer such as those containing tetrahydrofuran. The BLACK MAX TM adhesive and PRISM TM 704 primer material supplied by Loctite of Newington, Conn. have been used with great success. The polyurethane surface of layer 4 to be bonded is first coated with the primer. The adhesive is then applied to the metal blade 7. The two surfaces are quickly joined together and clamped. They are then allowed to cure in air at normal air temperatures for approximately 120 hours. This bonding process results in an extremely tight and secure bond that will withstand severe shock and abrasion. Other protective materials of similar hardness can be affixed to a blade 7 over the lift wings 2.

The angled leading, or forward, surface 10 of a protective layer 4 can have its leading edge cut blunt at 12 to flatten the forward edge where it is adhered to the flat horizontal area surface 6. In tests with a layer 4 bonded to the surface 6, a test piece had a small portion of the leading edge of the forward surface 10 cut off at approximately 90° to be blunt at 12 and produced a very successful operation of the blade 7, and provided an extended life. In a blade made, the layer 4 had its angled forward surface 10 with its leading edge essentially parallel to the rearward top of the cutting surface 1 of the blade. This distance measured in the range of 2 to 5 mm.

Alternately, for high production situations, polyurethane materials may be cast over the lift wing portion of the blade. In these circumstances the blade may be perforated to provide mechanical interlocking between the lift wing blade portion and the polyurethane material.

Although this invention has been shown and described with respect to detailed embodiments thereof, it will be understood by those skilled in the art that various changes in form and detail thereof may be made without departing from the spirit and scope of the claimed invention.

I claim:

1. A rotatable metallic cutting blade for mounting on a lawn mower, said blade including outwardly extending arms, each arm having a forward side and a rearward side, each arm having a cutting edge formed on the forward side thereof, each arm having the rearward side opposed to said cutting edge formed as an upwardly directed flange behind the cutting edge, the improvement which comprises a layer of resilient elastomeric material on each flange facing the forward side of the arm.

2. A rotatable blade as set forth in claim 1 wherein the cutting edge of each arm is formed at the bottom of an angled cutting surface, said cutting surface having a top, said resilient elastomeric material having a leading edge, said leading edge of the resilient elastomeric material being essentially parallel to the top of the cutting surface of the blade, each leading edge of the resilient elastomeric material has a forward surface tapered at an acute angle upwardly, measured from the flat surface of the blade.

3. A rotatable blade as set forth in claim 2 wherein said resilient elastomeric material is selected from the polyurethane family.

4. A rotatable blade as set forth in claim 1 wherein said resilient elastomeric material has a hardness of approximately 60a to 85a as measured on the Durometer Shore A scale of hardness and of a thickness of approximately one-eighth of one-quarter inch.

5. A rotatable blade as set forth in claim 1 wherein said resilient elastomeric material is selected from the polyurethane family.

6. A rotatable blade as set forth in claim 5 wherein the protective layer of polyurethane covers approximately all of the upwardly directed flange facing the forward side of the arm.

7. A rotatable blade as set forth in claim 6 wherein the cutting edge of each arm is formed at the bottom of an angled cutting surface, said cutting surface having a top, said protective layer of polyurethane having a leading edge, said leading edge of the protective layer of polyurethane plastic being essentially parallel to the top of the cutting surface of the blade, each leading edge of the protective layer has a forward surface tapered at an acute angle upwardly, measured from the flat surface of the blade.

8. A rotatable blade as set forth in claim 7 wherein the leading edge of the protective layer is 2 to 5 mm from the top of the cutting surface of the blade.

9. A rotatable blade as set forth in claim 7 wherein a recess is formed in the blade to receive the layer.

10. A rotatable blade as set forth in claim 6 wherein a recess is formed in the blade to receive the layer.

11. A rotatable blade as set forth in claim 1 having an elastomeric material which when tested for erosion using the Taber H18 test (ASTM C501) displays a material loss of less than about 50 mg in 1,000 cycles of testing.

12. A method of improving a rotary mower cutting blade having cutting edges on the forward portions of the blade and an upwardly directed flange on the rear portions of the blade behind each cutting edge, said method comprising the steps of:

(1) forming a layer of polyurethane plastic to cover each upwardly directed flange of said blade; and (2) adhering said polyurethane plastic to each flange to protect it from wear.

13. A method as set forth in claim 12 wherein in step (1) said polyurethane plastic has a hardness of approximately Durometer Shore A 60a to 85a and having a thickness of from about ⅛ to ¼ inch.

14. A method as set forth in claim 12 wherein step (2) is performed using a cyanoacrylate-type of adhesive.

* * * * *